Sept. 15, 1953
G. A. LYON
2,652,286
WHEEL STRUCTURE
Original Filed Nov. 24, 1944
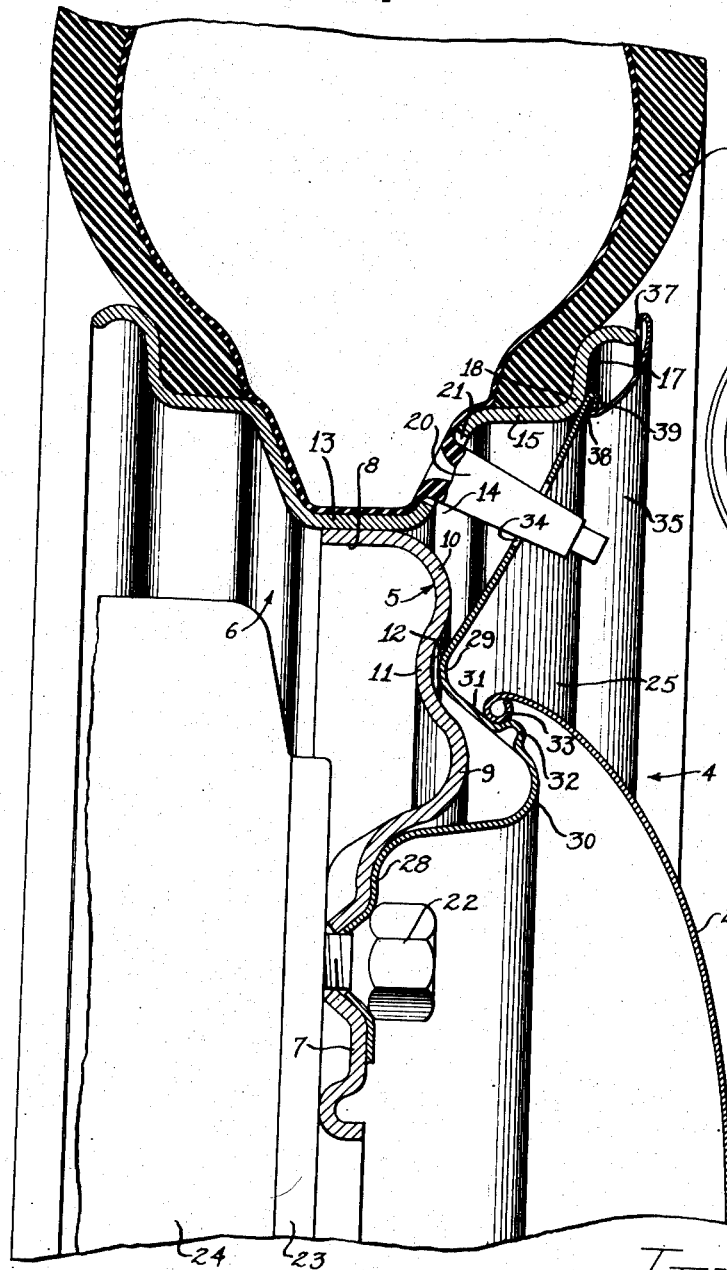
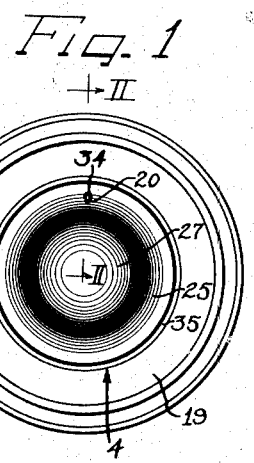
Inventor
George Albert Lyon Patented Sept. 15, 1953

2,652,286

UNITED STATES PATENT OFFICE 2,652,286

WHEEL STRUCTURE

George Albert Lyon, Detroit, Mich.

Original application November 24, 1944, Serial No. 564,971, now Patent No. 2,541,079, dated February 13, 1951. Divided and this application March 14, 1950, Serial No. 149,632

6 Claims. (Cl. 301—37)

This invention relates to a wheel structure and more particularly to an ornamental cover for disposition over the outer side of a vehicle wheel.

An object of this invention is to provide an improved wheel structure that is devoid of rattling, squeaks or similar undesirable noises, and moreover a cover which when applied will fit closely to the wheel irrespective of manufacturing tolerances in the disposition of the wheel body and the tire rim.

Another object of the invention is to provide a novel, ornamental, disc-like cover for attachment to the central or nave part of a wheel in such a way as to cause the cover to be held under tension against the side of the wheel so as to prevent loosening of the bolts during usage of the vehicle.

A further object of the invention is to provide an improved, simplified structure for holding a multi-part cover on a wheel and which structure is rugged, economical to manufacture, and reliable in use.

Still another object of the invention is to provide a composite cover for disposition at the outer side of a vehicle wheel and in which one of the cover portions is attachable and removable from the other of the cover components in snap-on pry-off relationship.

Yet another object of the invention is to provide a novel wheel structure in which a portion of the wheel is in tensioned engagement with an inner part of the tire rim while an outer portion of the cover is in such relation to the tire rim extremity that such outer portion may yield relative to the tire rim under pressure.

Other objects, features and advantages of the present invention will more fully appear from the following detailed description of a preferred embodiment thereof taken in conjunction with the accompanying drawings wherein:

Figure 1 is a side view of a vehicle wheel including a cover structure embodying the features of the present invention; and Figure 2 is an enlarged, fragmentary radial sectional view taken substantially on the line II—II of Figure 1.

In the illustrated form of the present invention, a composite full covering wheel cover 4 is disposed at the outer side of a vehicle wheel including a wheel body 5 and a tire rim 6. The wheel body is preferably made from relatively heavy sheet material and may be in the form of a metallic stamping including a central bolt-on flange 7 and an outer generally axially extending attachment flange 8 while an intermediate generally outwardly bulging annular reinforcing body portion of the wheel body includes a radially inner axially outwardly bulging rib 9, a radially outer axially outwardly bulging rib 10 and an intermediate axially inwardly bulging rib 11 affording a sinuous, multi-rib reinforcing body for the wheel, the intermediate inwardly bulging rib defining an axially outwardly opening annular groove 12.

The tire rim 6 may be formed as a rolled sheet metal section including a base flange 13 attached to the attachment flange 8 of the wheel body. At its outer side, the tire rim has a side flange 14 diverging from the base flange 13 and merging with a generally axially outwardly extending intermediate flange 15 which in turn merges with a generally radially outwardly and then axially outwardly turned terminal flange 17. A shoulder 18 is formed at juncture of the intermediate flange 15 with the terminal flange 17. The flanged arrangement of the tire rim is such as to afford a multi-flange section providing a drop center pneumatic tire and tube assembly supporting structure for carrying a tire and tube assembly 19, the tube having a valve stem 20 which projects through a valve stem aperture 21 in the side flange 14.

The wheel is attached to a vehicle by means of fastening bolts or cap screws 22 by which the bolt-on flange 7 is secured to an axle part 23 of a vehicle and with which a brake drum 24 is associated.

The cover 4 comprises an annular cover member 25 which is secured in position on the wheel, and a central hub cap cover member 27.

The annular member 25 is of a diameter and expanse to substantially cover the outer side of the tire rim and the wheel body and has a central bolt-on flange portion 28 which is formed substantially complementary to the bolt-on flange 7 of the wheel body, having correspondingly stepped, apertured and flanged structure to facilitate alignment thereof with the bolt apertures in the bolt-on flange 7 and to provide recessed portions for seating the tapered head portions of the bolts 22 by which the cover bolt-on flange 28 is clamped securely to the wheel body bolt-on flange 7. By this arrangement, when the wheel is removed from the vehicle, the cover is at the same time detached from the wheel so as to be applied to the replacement wheel.

The cover part 25 is so shaped and related to the outer side of the wheel as to be placed under tension when clamped and secured to the body part 5 by the bolts 22. To this end, the outer margin of the annular cover part 25 is dimensioned to lie against the shoulder 18 on the tire rim, while the remainder of the cover part 25 between the bolt-on flange 28 thereof and the outer margin of the cover part remains out of contact with the wheel body and the tire rim. The arrangement is such that when the cover part 25 is applied to the wheel, the outer margin thereof first contacts the shoulder 18 and thereafter the central bolt-on flange 28 is drawn against the wheel bolt-on flange 7 by the bolts 22 so that the outer margin of the cover part is held resiliently in tight engagement with the rounded shoulder portion 18 of the tire rim.

From the outer margin, the cover annulus 25 extends generally radially and axially inwardly to an axially inwardly projecting annular intermediate rib 29 which extends into the wheel body groove 12 in spaced relation and merges with an annular rib 30 on the annular cover part projecting substantially axially outwardly over the wheel body rib 9. At its inner side the cover rib 30 merges with the bolt-on flange 28 of the cover.

At its outer side the annular cover rib 30 is formed with a generally axially inwardly and radially outwardly sloping surface 31 which adjacent to the peak of the rib 30 is formed with a series of generally radially outwardly projecting cover retaining protrusions or bumps 32 for retainingly engaging with the margin of the central cover member 27. For this purpose, the central cover member 27 provides a generally crowned convex member having a marginal bead 33 of a diameter to engage in snap-on pry-off relation behind the bumps 32 and with the bead resting against the sloping surface 31 of the annular cover member serving as a centering, retaining shoulder for the bead 33. Thus, when the cover 27 is snapped into retained position on the surface 31 of the cover rib 30, it is held effectively not only against displacement axially outwardly but also against skewing relative to the annular cover member 25 since the shoulder provided by the sloping surface 31 and the retaining bumps 32 cooperate to hold the central cover member 27 centered with respect to the annular cover member 25 in concentric concealing relation to the central bolt-on flange 28 and the rib 30.

To facilitate pry-off, the side 31 of the rib 30 extends substantially beyond the cover bead 33 so that a pry-off tool can conveniently be applied behind the marginal bead 33 to pry the central circular cover 27 from the annular cover member 25.

An opening 34 is provided in the cover 25 for projection of the valve stem 20.

It is desirable to cover the entire outer side of the tire rim 6, including the terminal flange 17. However that portion of the cover which extends into overlying relation to the terminal flange 17 is liable to substantial abuse by reason of proximity to the tire and also by reason of the fact that this portion of the assembly is most liable to be run against curbing or other obstructions. In order to minimize damaging stresses and strains upon the tire rim terminal flange covering portion of the cover, such cover portion may be so related to the body of the annular cover member 25 so as to be somewhat yieldable relative to the tire rim terminal flange 17. To this end, the outer extremity of the cover assembly comprises an annular cover portion 35 of preferably generally convex cross section extending from the outer marginal portion of the cover member 25 that rests against the tire rim shoulder 18 into overlying relation to the terminal flange 17 and radially beyond the tip of the terminal flange but spaced axially outwardly therefrom so as to have a range of relative movement clearance with respect to the terminal flange. At its outer edge the cover member 35 is preferably formed with a turned under narrow reinforcing flange 37.

At its inner margin, the annular outer cover member 35 is formed with a generally radially outwardly extending underturned flange 38 which is lock seamed with an outturned and generally radially inwardly extending flange 39 at the outer extremity of the cover member 25. Through this arrangement, the outer annular cover member 35 can have a limited range of both axial and radially inward flexing movement with respect to both the tire rim terminal flange 17 and the cover member 25 whereby to relieve the cover member 35 from undue stress and also relieving the cover member 25 from such stresses as are imposed upon the cover member 35 when it is resiliently flexed or deflected for any reason.

All portions of the cover 4 can be made from a suitable sheet material, and the outer extremity cover annulus 35, especially, is preferably made from a material of substantial inherent resilience, the transversely curved cross sectional shape of the member 35 enhancing its resilience.

The present application is a division of my application Serial No. 564,971, filed November 24, 1944, now Patent No. 2,541,079, dated February 13, 1951.

It will be understood that modifications and variations may be effected without departing from the scope of the novel concepts of the present invention.

I claim as my invention:

1. In combination, a wheel including a multi-flanged rim part, a body part having a radially outwardly stepped center portion, a disc-like ornamental wheel cover disposed over said body part and over a portion of said rim part and having a correspondingly stepped center portion clamped in nested relationship with said body part center portion and including an axially and outwardly extending curved portion spaced from said body part and disposed circularly about the axis of said cover, and a plurality of protuberances struck out radially outwardly of said curved portion for detachably supporting a hub cap, said cover including a separate ring secured to the outer peripheral edge of said wheel cover and adapted to overhang the exposed outer edge of said rim part.

2. In a wheel structure including a wheel body and a multi-flanged tire rim, the tire rim having a shoulder at the base of the terminal flange of the tire rim and the wheel body having a pair of axially outwardly protruding annular ribs with an intervening annular groove, a cover having an annular portion with a radially inner part for attachment to the wheel body radially inwardly from the radially innermost of said body ribs, said annular cover member having an undulating cross section including a generally axially outwardly projecting annular rib overlying the radially innermost rib of the wheel body and a generally axially inwardly extending annular rib extending into said groove, the cover member radially outwardly from said axially inwardly extending rib extending generally axially and radially outwardly and having a marginal portion lying against said tire rim shoulder, said cover member axially outwardly extending rib having radially outwardly projecting cover retaining bumps on the radially outer side thereof, and a circular cover member overlying the central portion and axially outwardly extending rib of the annular cover member and having a beaded margin engaging in snap-on, pry-off relation behind said bumps.

3. In a wheel structure including a wheel body and a multi-flanged tire rim, the tire rim having a shoulder at the base of the terminal flange of the tire rim and the wheel body having a pair of axially outwardly protruding annular ribs with an intervening annular groove, a cover having an annular portion with a radially inner part for attachment to the wheel body radially inwardly from the radially innermost of said body ribs, said annular cover member having an undulating cross section including a generally axially outwardly projecting annular rib overlying the radially innermost rib of the wheel body and a generally axially inwardly extending annular rib extending into said groove, the cover member radially outwardly from said axially inwardly extending rib extending generally axially and radially outwardly and having a marginal portion lying against said tire rim shoulder, said cover member axially outwardly extending rib having radially outwardly projecting cover retaining bumps on the radially outer side thereof, and a circular cover member overlying the central portion and axially outwardly extending rib of the annular cover member and having a beaded margin engaging in snap-on, pry-off relation behind said bumps, the radially outer margin of said annular cover member having an ornamental annulus of convex cross section attached thereto and extending generally radially and axially outwardly in concealing relation to the tire rim terminal flange.

4. In a wheel structure including a wheel body and a multi-flanged tire rim, the tire rim having an intermediate generally axially extending flange and a terminal flange including a generally radially extending portion and an axially extending extremity portion, the juncture of the intermediate flange and the radially extending portion of the terminal flange providing an outwardly facing shoulder, a cover member disposed at the outer side of the wheel and having a margin bearing against said shoulder and another portion extending axially and radially outwardly beyond said shoulder and overlying said axially extending portion of the terminal flange in spaced relation.

5. In a wheel structure including a wheel body and a multi-flanged tire rim including a generally outwardly extending shoulder at juncture of a terminal flange and an intermediate flange thereof, a cover disposed at the outer side of the wheel and including a cover member in generally concealing relation to the wheel body and the tire rim and having its outer margin bearing against said shoulder, and an annular relatively narrow cover member having its inner margin secured to said outer margin and extending generally axially and radially outwardly in concealing relation to the tire rim terminal flange, said annular cover member lying in spaced relation both radially outwardly and axially outwardly from the tip of the terminal flange and being resiliently movable relative thereto for shock and stress relieving purposes.

6. In a wheel structure including a wheel body and a multi-flanged tire rim including a generally outwardly extending shoulder at juncture of a terminal flange and an intermediate flange thereof, a cover disposed at the outer side of the wheel and including a cover member in generally concealing relation to the wheel body and the tire rim and having its outer margin bearing against said shoulder, and an annular relatively narrow cover member having its inner margin secured to said outer margin and extending generally axially and radially outwardly in concealing relation to the tire rim terminal flange, said annular cover member lying in spaced relation both radially outwardly and axially outwardly from the tip of the terminal flange and being resiliently movable relative thereto for shock and stress relieving purposes, both the inner and outer margins of said annular cover member being turned under for enhancing the resilience of said annular cover member.

GEORGE ALBERT LYON.

References Cited in the file of this patent

UNITED STATES PATENTS

| Number | Name | Date |
| --- | --- | --- |
| 2,537,072 | Lyon | Jan. 9, 1951 |